(12) United States Patent
Nakayama (10) Patent No.: US 9,853,264 B2
(45) Date of Patent: Dec. 26, 2017

(54) ELECTRIC STORAGE DEVICE

(71) Applicant: HONDA MOTOR CO., LTD., Tokyo (JP)

(72) Inventor: Shinya Nakayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 49 days.

(21) Appl. No.: 15/138,217

(22) Filed: Apr. 26, 2016

(65) Prior Publication Data

US 2016/0359152 A1 Dec. 8, 2016

(30) Foreign Application Priority Data

Jun. 4, 2015 (JP) ................................. 2015-113962

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
CPC .......................... H01M 2/1077; H01M 2220/20
See application file for complete search history.

(56) References Cited

U.S. PATENT DOCUMENTS

| | | | | |
|---|---|---|---|---|
| 8,999,557 B2* | 4/2015 | Kim | ................... | H01M 2/1077 429/156 |
| 9,225,035 B1* | 12/2015 | Werre | ............... | H01M 10/0468 |
| 2010/0000816 A1* | 1/2010 | Okada | ................. | H01M 2/1077 180/68.5 |
| 2013/0164592 A1* | 6/2013 | Maguire | ............. | H01M 2/1077 429/120 |
| 2013/0288094 A1* | 10/2013 | Noh | ..................... | H01M 2/1077 429/99 |

FOREIGN PATENT DOCUMENTS

JP 2013-122820 6/2013

\* cited by examiner

*Primary Examiner* — Stewart Fraser
(74) *Attorney, Agent, or Firm* — Mori & Ward, LLP (57) ABSTRACT

An electric storage device includes first storage modules, a second storage module, an attachment part, and a holding frame. The first storage modules includes one first storage module and another first storage module. The attachment part has an attachment surface on which the first storage modules are mounted. The holding frame is disposed between the one first storage module and the second storage module to hold the second storage module. The holding frame includes a first frame member and a second frame member. The first frame member has a first bottom portion connected to the attachment surface. The second frame member has a second bottom portion connected to the attachment surface such that the second bottom portion is disposed between the attachment surface and a lower part of the another first storage module.

6 Claims, 8 Drawing Sheets

ELECTRIC STORAGE DEVICE

CROSS-REFERENCE TO RELATED APPLICATIONS

The present application claims priority under 35 U.S.C. §119 to Japanese Patent Application No. 2015-113962, filed Jun. 4, 2015, entitled "Electric Storage Device." The contents of this application are incorporated herein by reference in their entirety.

BACKGROUND

1. Field

The present invention relates to an electric storage device.

2. Description of the Related Art

In a general storage module (battery module), a plurality of storage cells (battery cells) are stacked. Since this storage module is mounted in an electric motor vehicle such as a hybrid vehicle or an EV, the output voltage is set high by stacking multiple storage cells.

A vehicle-mounted storage module adopts a structure storage modules are arranged in two upper and lower stages to efficiently utilize the space inside the vehicle. As such a type of technique, for example, Japanese Unexamined Patent Application Publication No. 2013-122820 discloses a battery module unit in which a platelike support member is laid across both ends of a lower storage module in the cell stacking direction with a pair of support legs being disposed therebetween. On an upper surface of the support member, two storage modules are arranged in series with their end surfaces in the longitudinal direction (cell stacking direction) being opposed to each other.

SUMMARY

According to a first aspect of the present invention, an electric storage device includes a plurality of first storage modules, a second storage module, an attachment part, and a holding frame. The plurality of first storage modules each include a plurality of storage cells stacked. The second storage module includes a plurality of storage cells stacked. The first storage modules are fixed to the attachment part in line. The holding frame holds the second storage module above a predetermined first storage module of the first storage modules in a height direction. The holding frame is divided into at least a first frame member and a second frame member. The first frame member has a first bottom portion fixed to the attachment part. The second frame member has a second bottom portion set below the other first storage module adjacent to the predetermined first storage module and fixed to the attachment part.

According to a second aspect of the present invention, an electric storage device includes first storage modules, a second storage module, an attachment part, and a holding frame. The first storage modules includes one first storage module and another first storage module. Each of the first storage modules includes a plurality of stacked first storage cells and has an upper part and a lower part opposite to the upper part in a height direction of each of the first storage modules. The second storage module includes a plurality of stacked second storage cells. The attachment part has an attachment surface on which the first storage modules are mounted such that the attachment surface faces the lower part of each of the first storage modules and the height direction of each of the first storage modules is substantially perpendicular to the attachment surface. The holding frame is disposed between the one first storage module and the second storage module to hold the second storage module on the upper part of the one first storage module. The holding frame includes a first frame member and a second frame member. The first frame member has a first bottom portion connected to the attachment surface. The second frame member has a second bottom portion connected to the attachment surface such that the second bottom portion is disposed between the attachment surface and the lower part of the another first storage module.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
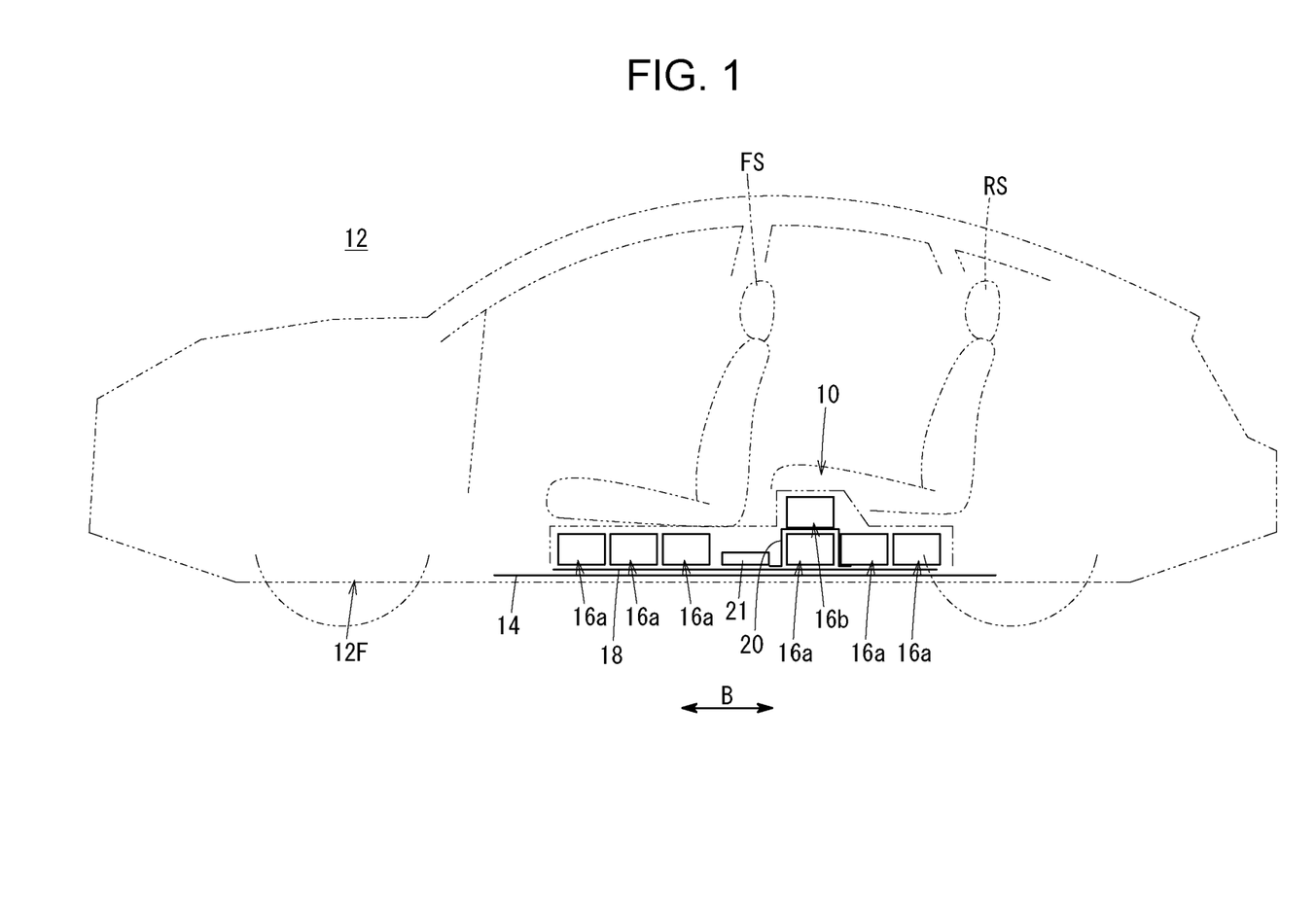
FIG. 1 is a schematic side view of an electric motor vehicle in which an electric storage device according to a first embodiment of the present disclosure is incorporated.

As illustrated in FIG. 1, an electric storage device 10 according to a first embodiment of the present disclosure is mounted in an electric motor vehicle (for example, a hybrid vehicle or an EV) 12. The electric motor vehicle 12 can run with a drive motor (not illustrated) being driven by electric power supplied from the electric storage device 10.

Figure 2:
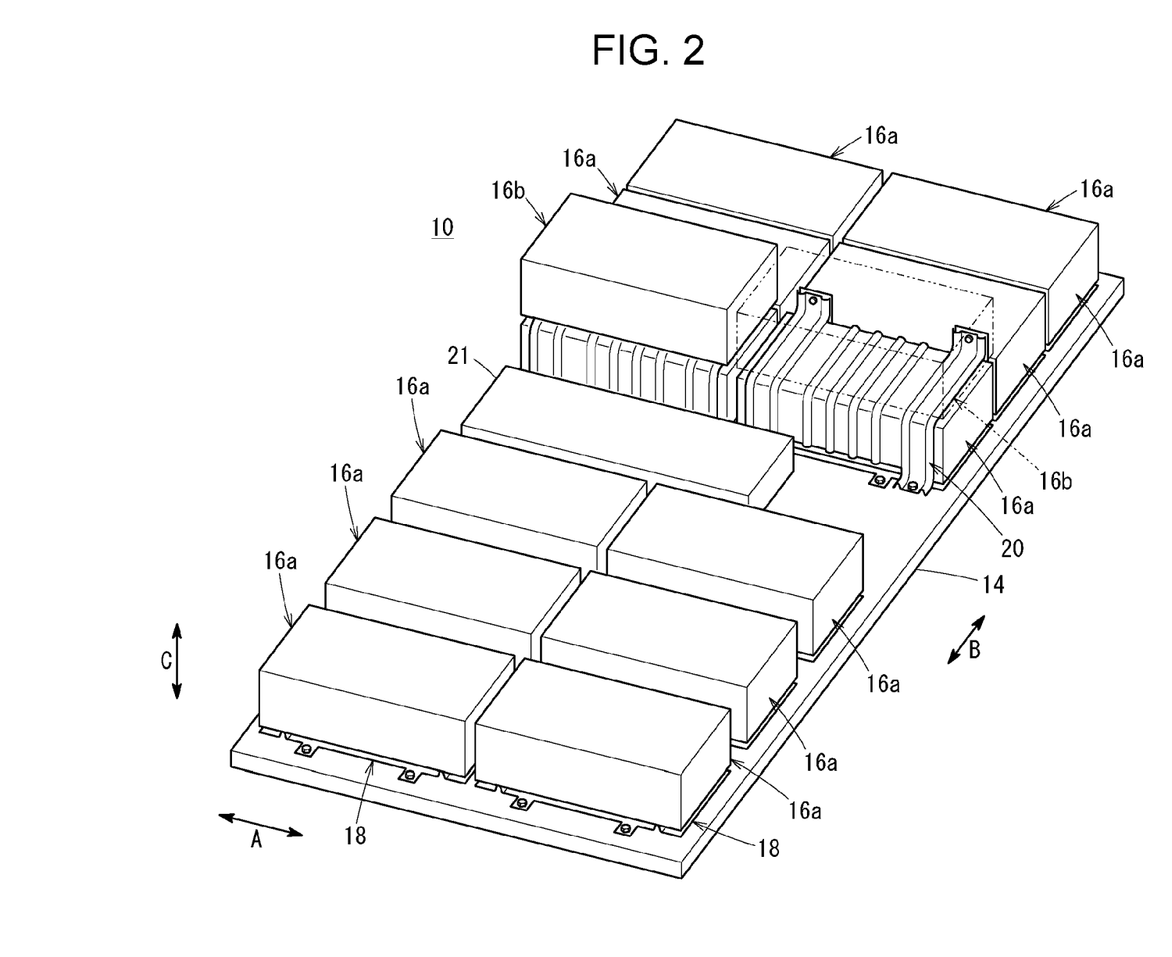
FIG. 2 is an explanatory perspective view of the principal part of the electric storage device.

The electric motor vehicle 12 includes a vehicle body frame 12F, and a fixing plate (attachment part) 14 is provided in the vehicle body frame 12F. The fixing plate 14 extends from a lower side of a front seat FS to a lower side of a rear seat RS. As illustrated in FIGS. 1 and 2, a plurality of first storage modules 16a are mounted on the fixing plate 14 with a mounting plate 18 being disposed therebetween.

A plurality of, for example, two second storage modules 16b are provided above a predetermined first storage module 16a in the height direction. The second storage modules 16b are arranged in series in a cell stacking direction (direction of arrow A). The predetermined first storage module 16a refers to, for example, two first storage modules 16a arranged in series in the cell stacking direction on the rear side of the vehicle. On the fixing plate 14, a control unit 21 is mounted in a space in almost the center of the plate surface. The control unit 21 includes various devices such as an inverter device, a relay device, and a battery ECU.

Figure 3:
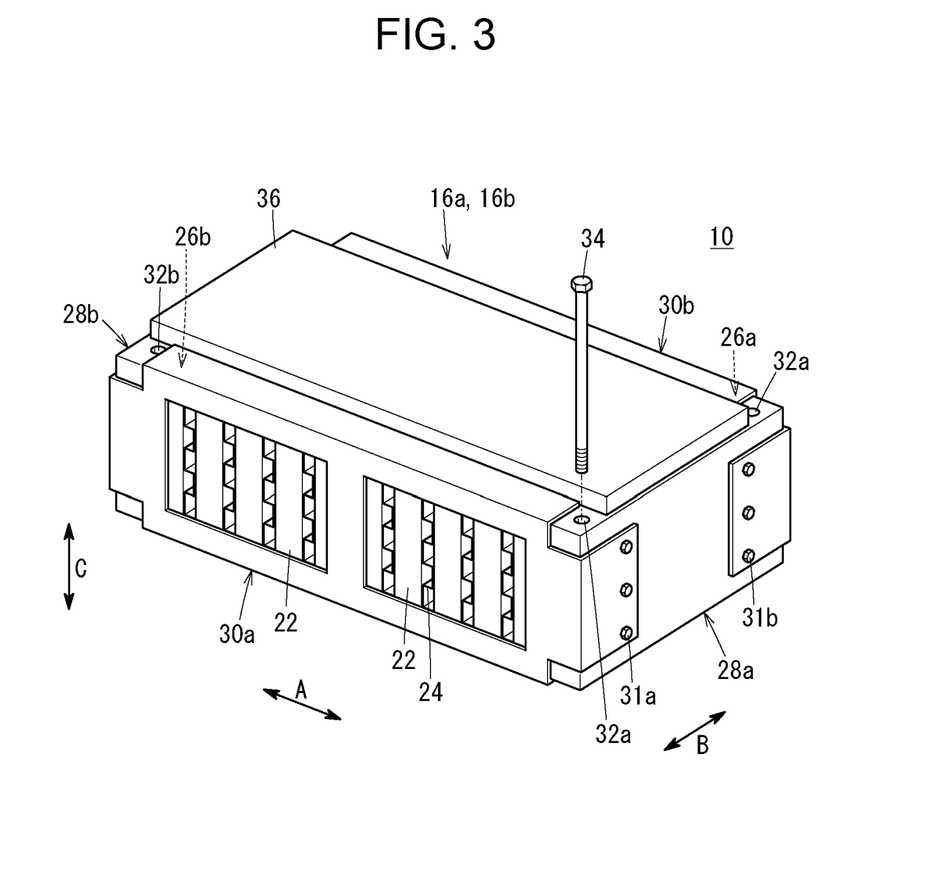
FIG. 3 is an explanatory perspective view of a storage module that constitutes the electric storage device.

As illustrated in FIG. 3, in each of the first storage modules 16a and the second storage modules 16b, a plurality of storage cells 22 are stacked in the horizontal direction (direction of arrow A). The storage cells 22 are rectangular, and are stacked in the direction of arrow A while being arranged in a standing posture so as to alternate with separators (holders) 24 having the electrical insulation property. For example, the storage cells 22 are formed by lithium ion batteries and have a rectangular shape (or a square shape).

At opposite ends of the stack of the storage cells 22 in the stacking direction, rectangular (or square) end plates 28a and 28b are disposed with insulator plates 26a and 26b (or the separators 24) having the heat insulating function and the electric insulating function being disposed therebetween, respectively. The end plates 28a and 28b are connected by, for example, a pair of connection bands 30a and 30b arranged at opposite ends in the direction of arrow B and extending in the direction of arrow A. Thus, a plurality of storage cells 22 are held integrally.

The end plates 28a and 28b are substantially shaped like a flat plate. End portions of the connection bands 30a and 30b are fixed to end portions of the end plates 28a and 28b in the direction of arrow B by a plurality of screws 31a and 31b. Holes 32a vertically penetrate both end portions of the end plate 28a in the direction of arrow B, and holes 32b vertically penetrate both end portions of the end plate 28b in the direction of arrow B. Fixing screws 34 are inserted in the holes 32a and 32b.

For example, a busbar unit 36 is attached to the top of each of the first storage modules 16a and the second storage modules 16b. The busbar unit 36 electrically connects a positive electrode terminal of one of adjacent storage cells 22 and a negative electrode terminal of the other storage cell 22. A plurality of storage cells 22 are electrically connected in series by the busbar unit 36.

Figure 4:
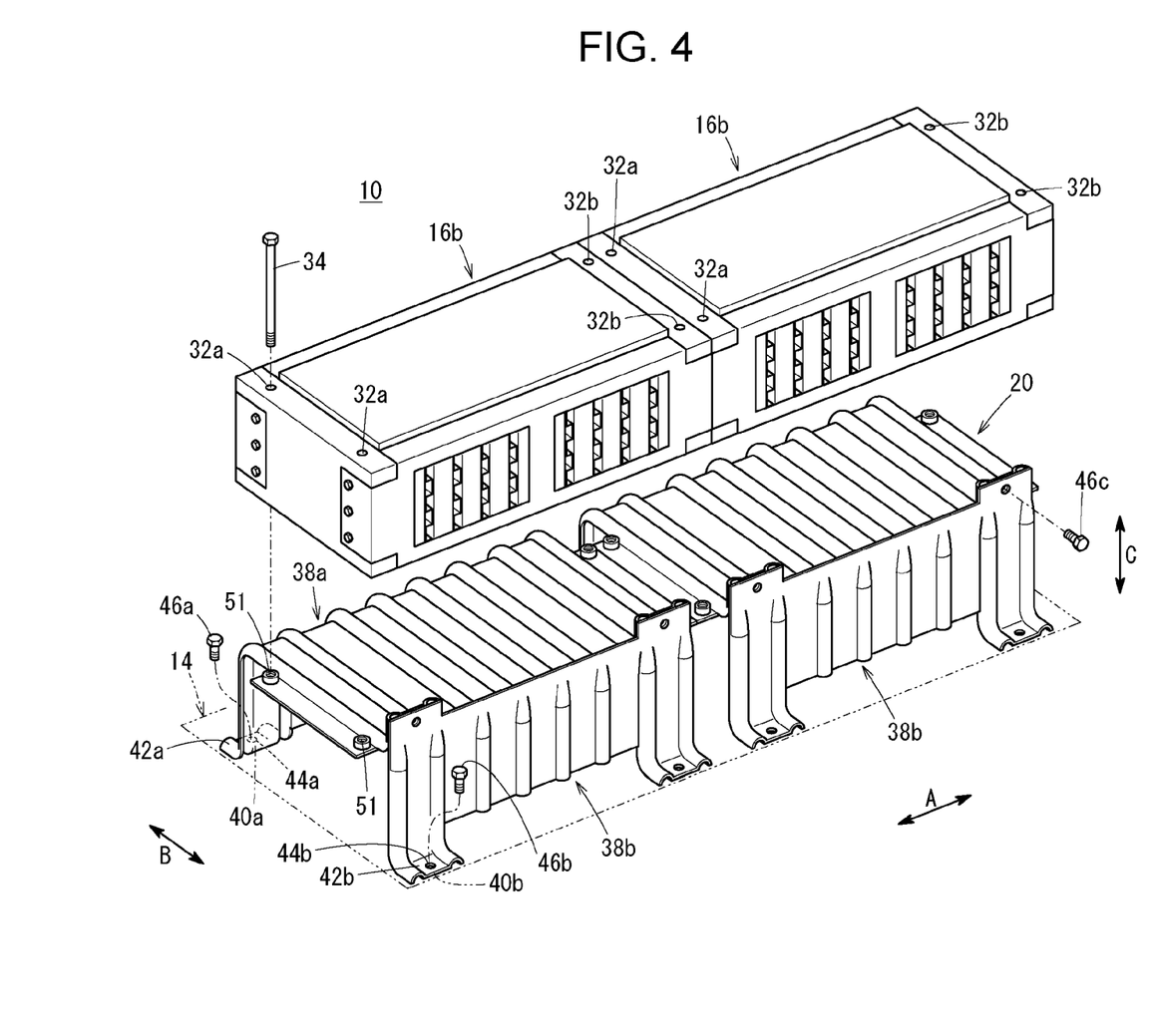
FIG. 4 is an exploded explanatory perspective view of a holding frame and storage modules that constitute the electric storage device.
Figure 5:
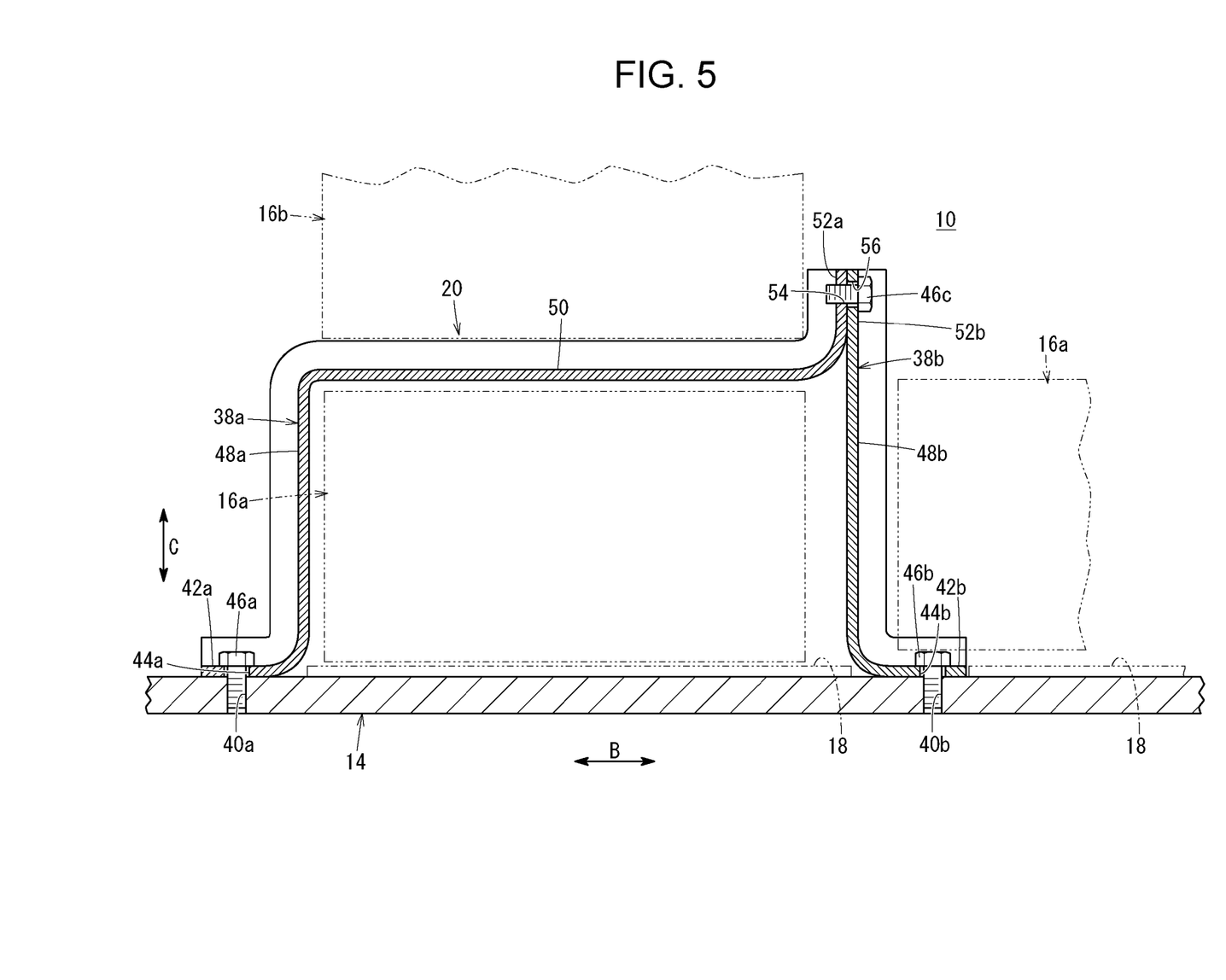
FIG. 5 is an explanatory side view of the holding frame and the storage modules.
Figure 6:
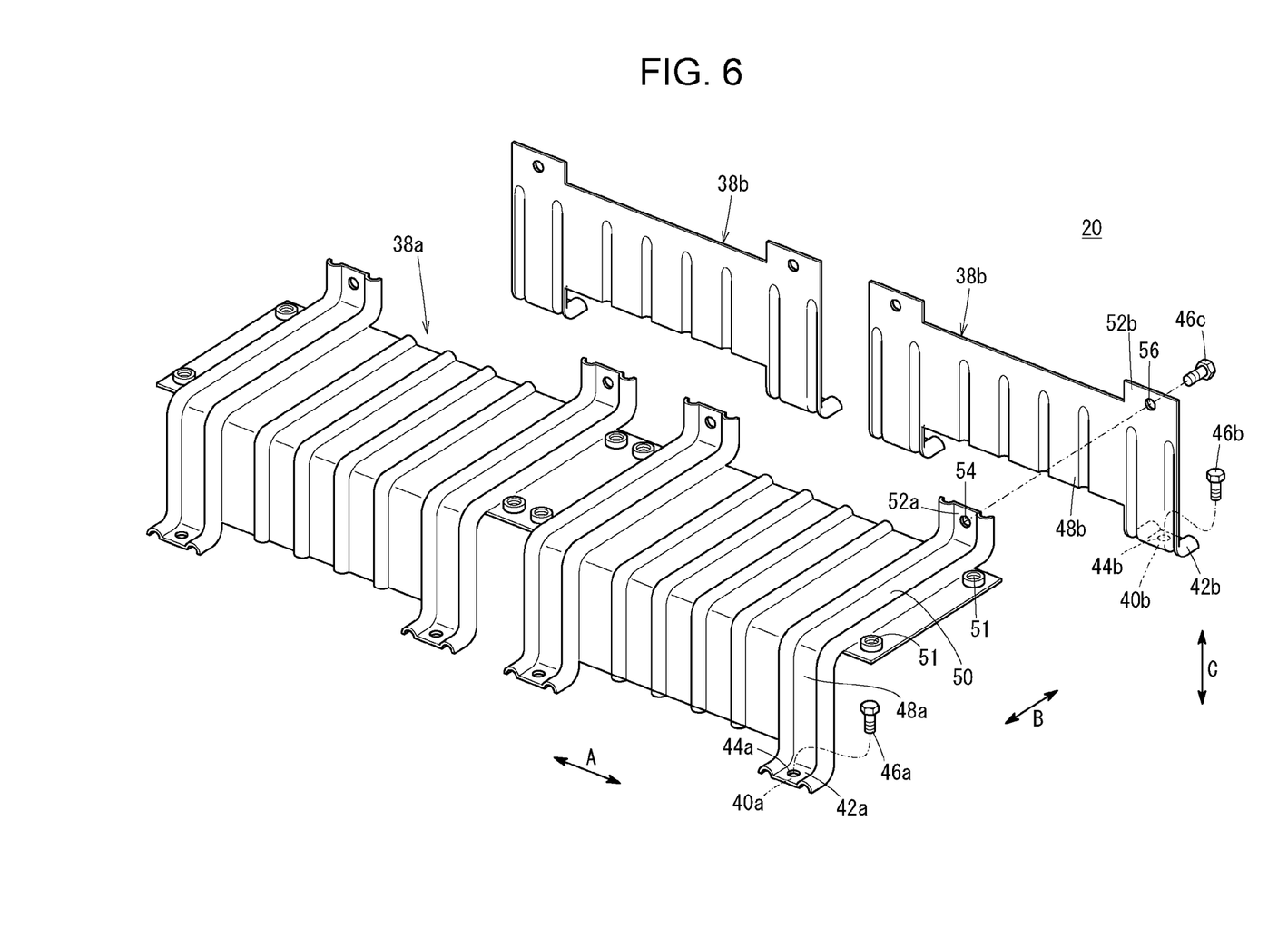
FIG. 6 is an exploded explanatory perspective view of the holding frame.

As illustrated in FIGS. 4 to 6, the holding frame 20 is formed by a metal plate, and is divided into at least a first frame member 38a and a second frame member 38b. The first frame member 38a has a plurality of, for example, four first bottom portions 42a (the number is not limited) to be fixed to the fixing plate 14 via screw holes (attachment part) 40a provided in the fixing plate 14.

The first bottom portions 42a are each shaped like a rectangle extending in the surface direction of the fixing plate 14, and have their respective holes 44a coaxial with the screw holes 40a. Screws 46a are inserted in the holes 44a and screwed in the screw holes 40a, and the first frame member 38a is thereby fixed to the fixing plate 14.

The first frame member 38a includes a first vertical portion 48a bent from the first bottom portions 42a and extending upward, and a horizontal portion 50 bent from an upper end portion of the first vertical portion 48a and extending in the horizontal direction. The first vertical portion 48a and the horizontal portion 50 cover two surfaces (one side surface and an upper surface) of each of two first storage modules 16a arranged in line (in series) in the cell stacking direction.

As illustrated in FIGS. 4 and 6, the first vertical portion 48a and the horizontal portion 50 are provided with a reinforcing uneven shape portion formed by, for example, press forming. The horizontal portion 50 has screw holes 51 provided coaxially with holes 32a and 32b provided in two second storage modules 16b. When the fixing screws 34 are inserted in the holes 32a or 32b and are screwed in the screw holes 51, the two second storage modules 16b are fixed to the horizontal portion 50 of the first frame member 38a (see FIG. 4).

A plurality of, for example, four first flange portions 52a are provided in an end portion of the horizontal portion 50 to bend and extend upward. The first flange portions 52a have their respective screw holes 54 (see FIGS. 5 and 6).

While the second frame member 38b is divided, for example, in two, it may be formed by a single component. The second frame member 38b is provided with a plurality of, for example, four second bottom portions 42b (the number is not limited) to be fixed to the fixing plate 14 via screw holes (attachment part) 40b provided in the fixing plate 14. The first bottom portions 42a and the second bottom portions 42b project in a direction (direction of arrow B) intersecting the stacking direction (direction of arrow A) of the storage cells 22.

The second bottom portions 42b are each shaped like a rectangle extending in the surface direction of the fixing plate 14, and have their respective screw holes 44b provided coaxially with the screw holes 40b. When screws 46b are inserted in the screw holes 44b and screwed in the screw holes 40b, the second frame member 38b is fixed to the fixing plate 14.

As illustrated in FIG. 5, the second bottom portions 42b are set below other first storage modules 16a adjacent to the predetermined first storage modules 16a. The other first storage modules 16a refer to, for example, two first storage modules 16a that are adjacent to the rear side of the predetermined first storage modules 16a in the vehicle length direction and are arranged in series in the cell stacking direction.

The second frame member 38b has a second vertical portion 48b bent from the second bottom portions 42b and extending upward. A plurality of second flange portions 52b are provided at an upper end of the second vertical portion 48b (for example, two second flange portions 52b are provided in each part of the second frame member 38b), and the second flange portions 52b have their respective holes 56. The first flange portions 52a and the second flange portions 52b are separably connected by screws 46c (connecting part). When the screws 46c are inserted in the holes 56 and are screwed in the screw holes 54, the first flange portions 52a and the second flange portions 52b are fixed to each other.

As illustrated in FIGS. 4 to 6, the electric storage device 10 having this structure includes the holding frame 20 that holds two second storage modules 16b. The holding frame 20 has the second bottom portions 42b set below the other first storage modules 16a adjacent to the predetermined first storage modules 16a and fixed by the screws 46b and the screw holes (attachment part) 40b (see FIG. 5). Therefore, since the first storage modules 16a are disposed to cover the upper sides of the second bottom portions 42b projecting outward from the holding frame 20, the setting space inside the electric motor vehicle 12 can be utilized efficiently.

Further, the holding frame 20 is divided into the first frame member 38a and the second frame member 38b. For this reason, an operation of replacing the predetermined first storage modules 16a disposed below the holding frame 20 is easily performed only by separating the first frame member 38a from the second frame member 38b.

Specifically, the screws 46c are detached from the screw holes 54 in a state in which the second storage modules 16b on the holding frame 20 are removed. Therefore, the first flange portions 52a of the first frame member 38a are separated from the second flange portions 52b of the second frame member 38b.

Further, the first frame member 38a can be separated from the fixing plate 14 by detaching the screws 46a from the screw holes 40a. Thus, the first frame member 38a is detached from the fixing plate 14, and the predetermined first storage modules 16a fixed to the fixing plate 14 can be replaced.

For this reason, in the first embodiment, a plurality of first storage modules 16a and second storage modules 16b can be compactly stored inside the electric motor vehicle 12. Moreover, replacement of the first storage modules 16a can be performed efficiently and properly.

The first bottom portions 42a of the first frame member 38a and the second bottom portions 42b of the second frame member 38b project in the direction intersecting the stacking direction of the storage cells 22. Therefore, the first bottom portions 42a and the second bottom portions 42b do not project in the stacking direction of the storage cells 22, and this does not increase the total length of the electric storage device 10 in the stacking direction.

Further, the holding frame 20 is formed by a metal plate, and the metal plate is provided with the uneven shape portion for reinforcement. Thus, the first frame member 38a and the second frame member 38b that constitute the holding frame 20 have a desired rigidity, and the weight thereof is easily reduced by thinning.

Figure 7:
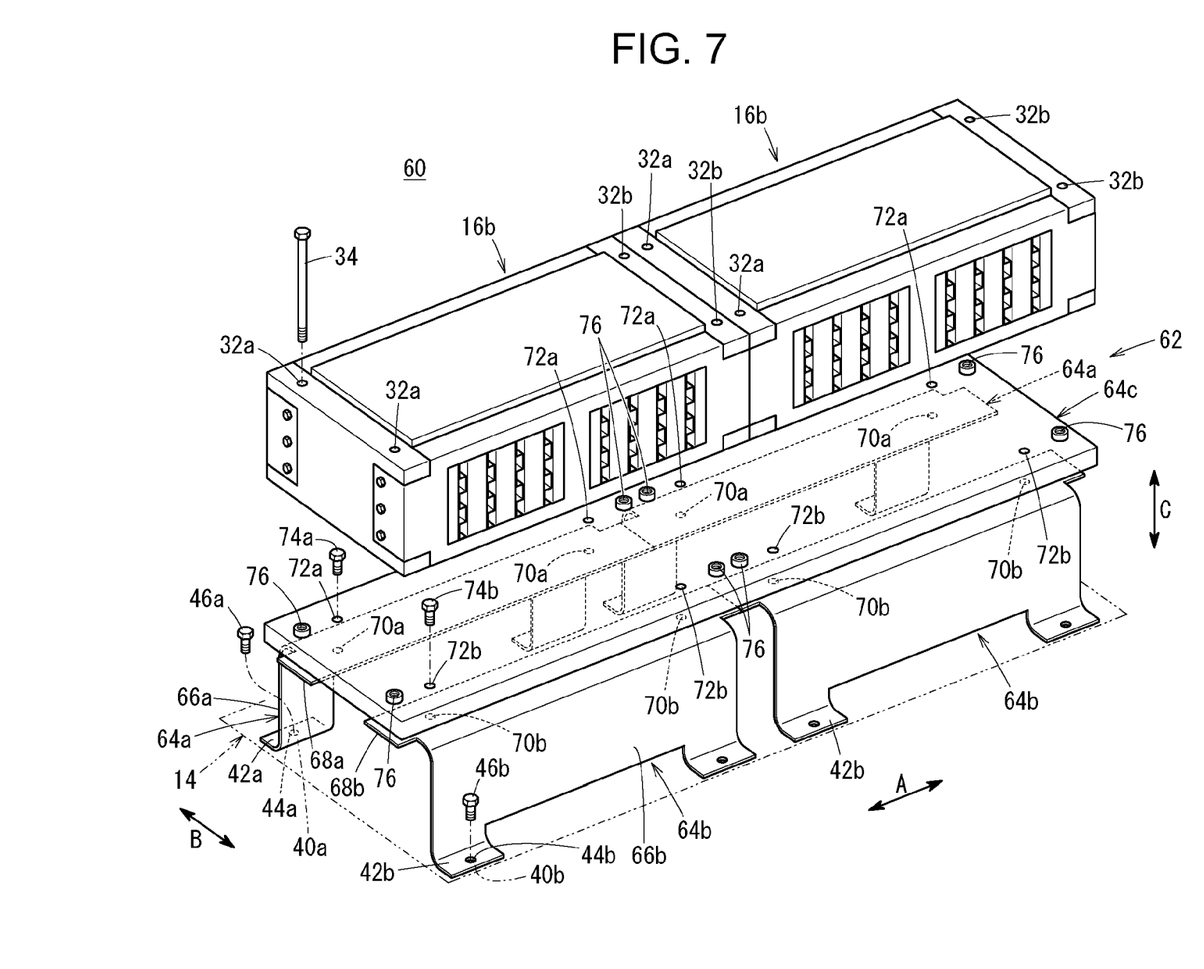
FIG. 7 is an exploded explanatory perspective view of the principal parts of a holding frame and storage modules that constitute an electric storage device according to a second embodiment of the present disclosure.

FIG. 7 is an exploded explanatory perspective view of the principal part of an electric storage device 60 according to a second embodiment of the present disclosure. The same constituent elements as those of the electric storage device 10 of the first embodiment are denoted by the same reference numerals, and detailed descriptions thereof are skipped.

Figure 8:
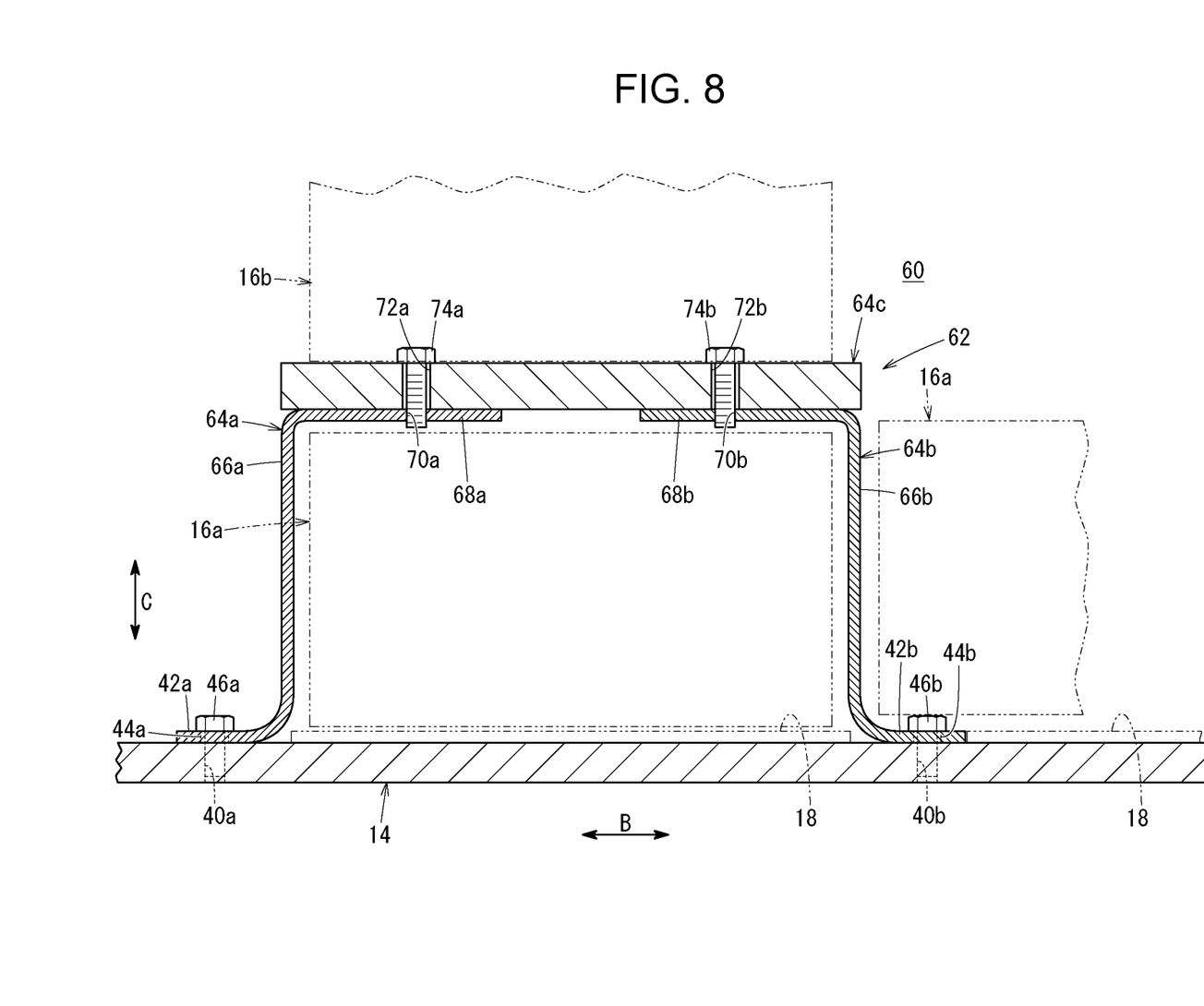
FIG. 8 is an explanatory side view of the holding frame and the storage modules.

The electric storage device 60 includes a holding frame 62. As illustrated in FIGS. 7 and 8, the holding frame 62 is formed by a metal plate, and is divided into at least a first frame member 64a, a second frame member 64b, and a third frame member 64c. While the first frame member 64a and the second frame member 64b are each divided, for example, in two, they may be formed by a single component.

The first frame member 64a has a first vertical portion 66a bent from a plurality of first bottom portions 42a and extending upward, and a first flange portion 68a bent in the horizontal direction is provided at an upper end of the first vertical portion 66a. The first flange portion 68a has first screw holes 70a.

The second frame member 64b has a second vertical portion 66b bent from a plurality of second bottom portions 42b and extending upward, and a second flange portion 68b bent in the horizontal direction is provided at an upper end of the second vertical portion 66b. The second flange portion 68b has second screw holes 70b.

The third frame member 64c is shaped like a flat plate, and has first holes 72a provided coaxially with the plural first screw holes 70a and second holes 72b provided coaxially with the plural second screw holes 70b. Screws 74a inserted in the first holes 72a are screwed in the first screw holes 70a, and screws 74b inserted in the second holes 72b are screwed in the second screw holes 70b.

As illustrated in FIG. 7, the third frame member 64c has screw holes 76 provided coaxially with holes 32a and 32b provided in two second storage modules 16b. Fixing screws 34 are inserted in the holes 32a or 32b and are screwed in the screw holes 76, and the two second storage modules 16b are thereby fixed to the third frame member 64c of the holding frame 62.

In the second embodiment that adopts this structure, the holding frame 62 is provided to hold two second storage modules 16b. As illustrated in FIG. 8, the holding frame 62 has the second bottom portions 42b set below other first storage modules 16a adjacent to predetermined first storage modules 16a and fixed by the screws 46b and the screw holes (attachment part) 40b. Therefore, effects similar to those of the above-described first embodiment can be obtained, that is, for example, the setting space inside the electric motor vehicle 12 can be efficiently utilized.

The first frame member 64a, the second frame member 64b, and the third frame member 64c that constitute the holding frame 62 may have an uneven shape portion for reinforcement, similarly to the first embodiment.

An electric storage device according to an aspect of the present disclosure includes a plurality of first storage modules in each of which a plurality of storage cells are stacked, a second storage module in which a plurality of storage cells are stacked, an attachment part to which the first storage modules are fixed in line, and a holding frame that holds the second storage module above a predetermined first storage module of the first storage modules in a height direction.

Preferably, the holding frame is divided into at least a first frame member and a second frame member, and the first frame member has a first bottom portion fixed to the attachment part. Preferably, the second frame member has a second bottom portion set below the other first storage module adjacent to the predetermined first storage module and fixed to the attachment part.

Preferably, the first bottom portion and the second bottom portion project in a direction intersecting a stacking direction of the storage cells.

Preferably, the first frame member includes a first vertical portion bent from the first bottom portion and extending upward, a horizontal portion bent from an upper end portion of the first vertical portion and extending in a horizontal direction, and a flange portion bent from the horizontal portion and extending upward. Preferably, the second frame member includes a second vertical portion bent from the second bottom portion and extending upward. Preferably, a connecting part is provided to separably connect an upper end of the second vertical portion and the flange portion.

Preferably, the holding frame is formed by a metal plate, and the metal plate has an uneven shape portion for reinforcement.

According to the present disclosure, the holding frame that holds the second storage module has the second bottom portion set below the other first storage module adjacent to the predetermined first storage module and fixed to the attachment part. Therefore, the first storage modules are arranged to cover the upper side of the second bottom portion projecting outward from the holding frame. Hence, the setting space inside the electric motor vehicle can be efficiently made compact.

Further, the holding frame is divided into the first frame member and the second frame member. For this reason, the operation of replacing the predetermined first storage module disposed below the holding frame is easily performed only by separating the first frame member from the second frame member. Thus, the plurality of storage modules can be compactly stored, and the workability of replacement of the storage modules can be improved significantly.

Obviously, numerous modifications and variations of the present invention are possible in light of the above teachings. It is therefore to be understood that within the scope of the appended claims, the invention may be practiced otherwise than as specifically described herein.

What is claimed is:

1. An electric storage device comprising: a plurality of first storage modules in each of which a plurality of storage cells are stacked;
   a second storage module in which a plurality of storage cells are stacked;
   an attachment part to which the first storage modules are fixed in line;
   and a holding frame that holds the second storage module above a predetermined first storage module of the first storage modules in a height direction,
   wherein the holding frame is divided into at least a first frame member and a second frame member,
   wherein the first frame member has a first bottom portion fixed to the attachment part, wherein the second frame member has a second bottom portion set below the other first storage module adjacent to the predetermined first storage module and fixed to the attachment part,
   wherein the first frame member includes:
   a first vertical portion bent from the first bottom portion and extending upward;
   a horizontal portion bent from an upper end portion of the first vertical portion and extending in a horizontal direction; and
   a flange portion bent from the horizontal portion and extending upward,
   wherein the second frame member includes a second vertical portion bent from the second bottom portion and extending upward, and
   wherein a connecting part is provided to separably connect an upper end of the second vertical portion and the flange portion.

2. The electric storage device according to claim 1, wherein the first bottom portion and the second bottom portion project in a direction intersecting a stacking direction of the storage cells.

3. The electric storage device according to claim 1, wherein the holding frame is formed by a metal plate, and wherein the metal plate has an uneven shape portion for reinforcement.

4. An electric storage device comprising: first storage modules including one first storage module and another first storage module, each of the first storage modules including a plurality of stacked first storage cells and having an upper part and a lower part opposite to the upper part in a height direction of each of the first storage modules;
   a second storage module including a plurality of stacked second storage cells;
   an attachment part having an attachment surface on which the first storage modules are mounted such that the attachment surface faces the lower part of each of the first storage modules and the height direction of each of the first storage modules is substantially perpendicular to the attachment surface; and
   a holding frame disposed between the one first storage module and the second storage module to hold the second storage module on the upper part of the one first storage module, the holding frame comprising:
   a first frame member having a first bottom portion connected to the attachment surface; and a second frame member having a second bottom portion connected to the attachment surface such that the second bottom portion is disposed between the attachment surface and the lower part of the another first storage module,
   wherein the first frame member includes:
   a first vertical portion bent from the first bottom portion and extending in the height direction;
   a horizontal portion bent from an upper end portion of the first vertical portion and extending in a horizontal direction; and
   a flange portion bent from the horizontal portion and extending in the height direction,
   wherein the second frame member includes a second vertical portion bent from the second bottom portion and extending in the height direction, and
   wherein a connecting part is provided to separably connect an upper end of the second vertical portion and the flange portion.

5. The electric storage device according to claim 4, wherein the first bottom portion and the second bottom portion project in a direction intersecting a stacking direction of the storage cells.

6. The electric storage device according to claim 4, wherein the holding frame is formed by a metal plate, and wherein the metal plate has an uneven shape portion for reinforcement.

* * * * *